219-121 SR
1/28/86 XR 4,566,938

United States Patent [19]

Jenkins et al.

[11] Patent Number: 4,566,938

[45] Date of Patent: Jan. 28, 1986

[54] TRANSFER ROLL WITH CERAMIC-FLUOROCARBON COATING CONTAINING CYLINDRICAL INK HOLES WITH ROUND, BEVELED ENTRANCES

[76] Inventors: Jerome D. Jenkins, 4749 N. 118th St., Wauwatosa, Wis. 53225; Neal G. Schultz, 8584 W. Appleton Ave., Milwaukee, Wis. 53218

[21] Appl. No.: 581,121

[22] Filed: Feb. 17, 1984

Related U.S. Application Data

[60] Division of Ser. No. 192,080, Sep. 29, 1980, abandoned, which is a continuation-in-part of Ser. No. 35,514, May 3, 1979, abandoned.

[51] Int. Cl.[4] .......................... B23K 9/00; B41F 1/46; B44C 1/22

[52] U.S. Cl. .................................... 156/643; 101/348; 156/645; 156/663; 156/905; 156/272.8; 219/121 LJ; 219/121 LS; 427/53.1

[58] Field of Search ................ 101/348; 156/643, 645, 156/663, 667, 905, 272.8; 219/121 LH, 121 LJ, 121 LS, 121 LM; 427/38, 39, 53.1

[56] References Cited

U.S. PATENT DOCUMENTS

| | | | |
|---|---|---|---|
| 3,832,948 | 9/1974 | Barker | 219/121 LM |
| 3,867,217 | 2/1975 | Maggs et al. | 156/643 |

*Primary Examiner*—William A. Powell
*Attorney, Agent, or Firm*—Howard L. Bernstein

[57] ABSTRACT

An ink transfer roll composed of a steel base covered by a ceramic-fluorocarbon outer layer into which are formed generally cylindrically shaped ink holes having a hemispherical bottom, a generally cylindrical intermediate portion and a rounded, beveled entryway. The ink holes are produced using a pulsed high energy source, such as a pulsed laser. An intermediate layer of corrosion resistant metal and fluorocarbon may be deposited between the steel base and the outer layer of ceramic-fluorocarbon material. Adhesion of the ceramic-fluoro-carbon layer to the transfer roll is improved if corrosion resistant metal-fluorocarbon material is contained in the ceramic-fluorocarbon layer such that the quantity of corrosion resistant metal-fluorocarbon material in the ceramic-fluorocarbon layer gradually decreases in the direction away from the intermediate layer-outer layer interface, the quantity of corrosion resistant metal-fluorocarbon material in said outer layer being greatest at said interface.

5 Claims, 3 Drawing Figures

TRANSFER ROLL WITH CERAMIC-FLUOROCARBON COATING CONTAINING CYLINDRICAL INK HOLES WITH ROUND, BEVELED ENTRANCES

RELATION TO OTHER PENDING APPLICATIONS

This application is a continuation-in-part of co-pending application Ser. No. 192,080 filed Sept. 29, 1980, abandoned which was a continuation-in-part of application Ser. No. 035,514, filed May 3, 1979, abandoned.

BACKGROUND OF THE INVENTION

The transfer roll has long been used in the printing industry to transfer a specified amount of ink or other, usually liquid, medium from the fountain roll to the print roll or material being printed. The quantity of ink transfered to the print roll or material to be coated is the amount contained within the pores or irregularities in the roll surface.

The history of the transfer roll is long and marked by many attempts at producing a long-wearing, corrosion resistant transfer roll capable of accurately metering desired quantities of ink. Early transfer rolls were made of soft metal which would be deformed by a knurling tool to form ink holes. These holes were generally hemispherical or pyramidal shaped to help the roll withstand the crushing force imparted by the doctoring system. In practice, the transfer roll usually runs against a doctor blade (either in a reverse or forward position) on a fountain roll. The doctor blade is made of hard, wear-resistant metal. The pressure of the doctor blade upon the soft metal transfer roll has a tendency to crush the ink holes and otherwise cause severe abrasions on the transfer roll surface. Ink transfer rolls having a soft metal surface with kurled or engraved holes for receiving ink are also very susceptible to damage from corrosive inks. Examples of such ink transfer rollers are illustrated in U.S. Pat. No. 2,393,529 which issued Jan. 22, 1946, to Harrigan and U.S. Pat. No. 2,638,050 which issued May 12, 1953, to King.

The ceramic transfer roll was developed in an attempt to improve the wear-resistance of the ink transfer roll. The first generation ceramic roll plasma coated a metal core with ceramic and either left the roll in the as sprayed configuration or ground the surface to a specific surface finish. In those cases where after grinding the surface was too smooth to do any metering, it was lightly grit blasted. In general, the inherent surface irregularities of the ceramic coating of the first generation ceramic roll provided the ink transfer surface. However, such ceramic rolls metered ink poorly and unevenly. Further, the exact lay-down or carrying capacity was difficult or impossible to duplicate. Also the rough textured surface of the rolls wore mating equipment more quickly. Examples of such ceramic coated transfer rolls are illustrated in British Pat. No. 1,407,079 published Sept. 24, 1975, based upon the application of Hans Schwoepfinger, as well as Canadian Pat. No. 1,009,507 which issued May 3, 1977, to Haye.

Further attempts to improve the ink transfer roll resulted in the second generation ceramic roll which was a mechanically engraved roll coated with ceramic. That is, the metal core of relatively soft metal material was knurled or engraved in the conventional manner to produce uniform ink holes of the hemishperical or pyramidal configuration. The engraved roller was then coated with a very thin ceramic layer. The ceramic necessarily had to be very thin for a build up of ceramic would fill the ink holes rendering the surface too smooth for ink transfer. While the second generation ceramic roll better metered ink than the first generation ceramic roll, most of the disadvantages of the first generation ceramic roll remained with the second generation ceramic roll. The second generation roll like the first generation roll had a rough textured surface making the mating equipment wear rapidly. The relatively thin ceramic coating rendered the ink transfer roll only slightly more damage resistant than the previously known metal rolls such as the prior art rolls described hereinbefore, and the prior art metal rolls which utilized a hard corrosion resistant metal surface over the soft metal core to assist in extending the roll life. In that the technique for forming the ink holes remained the same as that used in the very early rolls with knurled or engraved holes, these inking rolls were limited to the same degree as the early metal rolls in the number of the ink holes per line that could be formed. An example of the metal roll with a hard corrosion resistant metal surface is illustrated in U.S. Pat. No. 2,208,068 to Byle et al. This patent issued Oct. 13, 1959. Examples of the second generation ceramic roll are illustrated in U.S. Pat. No. 4,009,658 to Heurich which issued Mar. 1, 1977, and British Pat. No. 1,585,143 published Feb. 25, 1981 on the application of Pamarco Incorporated.

In each of the aforementioned references where ink holes were formed in the roll surface and the inherent roughness of the roll surface was not used for storing ink, a mechanical knurling or engraving is used. In U.S. Pat. No. 3,985,953 to Dunkley which issued Oct. 12, 1976, a gravure printing member made of a plastic material is provided with inking holes through the use of a continuous wave scanning laser beam or other energy beam.

There exists the need for an ink transfer roll with a hard surface such as that provided by a ceramic surface which exhibits a smooth mating surface to the mating equipment and which can meter the ink accurately while providing extremely fine line counts. If the surface of the roll is too coarse, excessive ink will be transfered to the print roll or material and hence a blotchy, smeared print will result. If the finish of the roll is too smooth, a light or skip pattern would appear in the printed work. If the transfer roll surface was not significantly damage resistant it would be scraped, gouged or scratched to produce a roll surface which would cause blobs of ink to transfer to the printing. Such problems exist with the known transfer roll.

SUMMARY OF THE INVENTION

An object of the invention is to provide a transfer roll providing a precise distribution of ink or other medium to the print roll or material to be printed, which transfer roll is durable, highly damage resistant and corrosion resistant and which does not exhibit a cutting action against a plate or doctor blade.

A further object of the invention is to provide a transfer roll which provides precise distribution of ink or other medium to the print roll or material being printed and which eliminates the moire effect.

A still further object of the invention is to provide an ink transfer roll capable of precise distribution of ink or other medium and which is capable of using extremely fine line counts while maintaining the same volume of ink.

These and other objects of the invention as will become apparent from a reading of the detailed description of the preferred embodiment of the invention as set forth hereinafter is realized by an ink transfer roll having a core of suitable material such as steel, the core being coated with a relatively thick layer of ceramic-fluorocarbon. The ceramic-fluorocarbon coated roll is subjected to the beam of a pulsed laser to produce generally cylindrically shaped ink holes having a cylindrical intermediate portion, a hemispherical bottom portion and a rounded, beveled entryway between the roller surface and the cylindrical intermediate portion. The ceramic-fluorocarbon layer is much thicker than the depth of the ink holes, such that the ink holes are fully within the ceramic-fluorocarbon layer. In a preferred embodiment of the invention, a core of carbon steel is coated with a layer of corrosion resistant metal-fluorocarbon polymer. The corrosion resistant layer is covered with a layer of ceramic-fluorocarbon polymer material. The coated roll is subjected to the pulsed laser operated at a non-uniform pulse rate. This produces non-uniform spacing between ink holes in a line as well as a phase difference between the ink holes on adjacent lines. The resulting non-uniform pattern eliminates the moire effect. The dispersion of the fluorocarbon polymer throughout the depth of the coating greatly lowers the dyne level to greatly enhance ink transfer. That is, the ceramic-fluorocarbon coating wears like a ceramic but releases like a material having a low coefficient friction which the fluorocarbon polymer has.

In that the ink holes are formed directly in the ceramic-fluorocarbon coating, the thickness of the ceramic coating can be made great to increase the wear and damage resistance of the roll. The defined ink hole shape, produced by the operation of the pulsed laser source in accordance with the teachings of this invention, elimates the cutting action inherent with square holes which exhibit sharp corners. The transfer roll of the invention is made with extremely fine line counts made possible because the depth limitations which are very stringent with mechanical engraving are not present with the plasma engraved rolls of the present invention.

DESCRIPTION OF THE PREFERRED EMBODIMENT OF THE INVENTION

Figure 1:
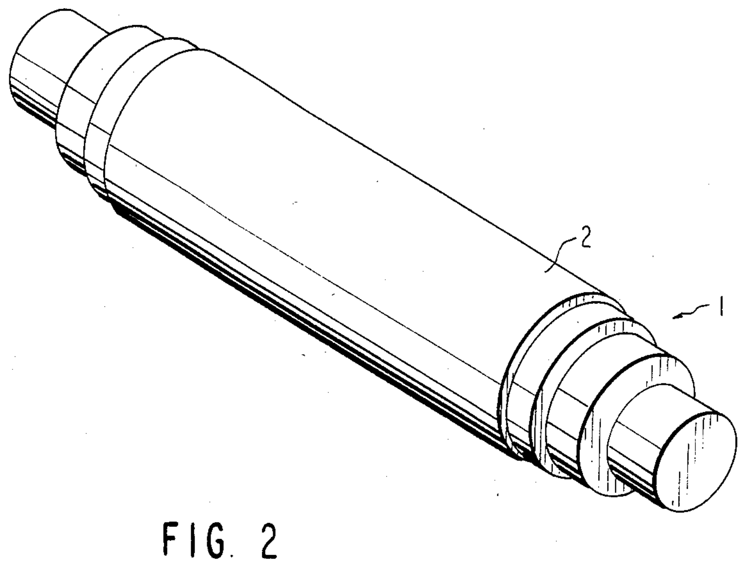
FIG. 1 is a perspective view of a transfer roll.
Figure 2:
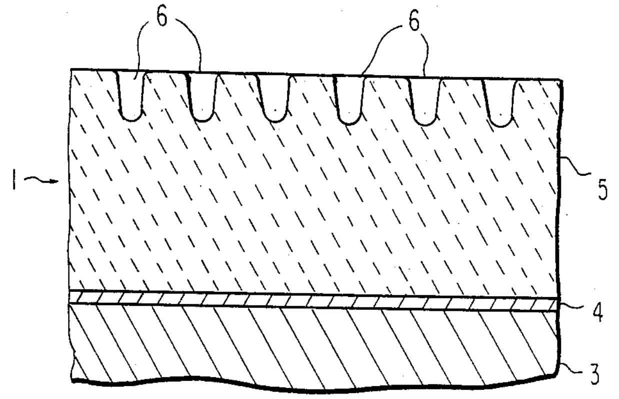
FIG. 2 is an enlarged fragmentary section view of the cylindrical portion 2 of the transfer roll showing the construction of the roll in accordance with the teachings of the present invention.

FIG. 1 illustrates a transfer roll having a conventional geometry. This roll has a cylindrical surface 2 according to the teachings of this invention as illustrated in FIG. 2. FIG. 2 illustrates a portion of the cross-section through the cylindrical surface 2 of roll 1. This cylindrical portion is composed of a base or substrate 3, preferrably of carbon steel, covered by a layer 4 of corrosion resistant metal mixed with a fluorocarbon polymer. Covering the corrosion resistant metal-fluorocarbon polymer layer 4 is a layer 5 composed of a mixture of ceramic and fluorocarbon polymer material.

The corrosion resistant metal of layer 4 can be any corrosion resistant metal, such as stainless steel, nickel, titanium, aluminum-titanium and the like. Generally, the corrosion resistant metal-fluorocarbon layer 4 will have a thickness in the range of 0.001 to 0.050 inch.

The ceramic-fluorocarbon polymer layer 5 has a thickness in the range of 0.003 to 0.080 of an inch. It has been determined that excellent durability is realized when the layer 5 has a thickness about 0.040 of an inch. The layers 4 and 5 can be applied to the surface of the base 3 with a conventional plasma arc process using a multi-ported nozzle in which a torch produces and controls a high velocity inert plasma gas stream that can attain temperatures over 30,000° F. The hot gas stream melts and accelerates to a high velocity the particles of metal, ceramic, and fluorocarbon polymer materials. When the molten particles strike the substrate 3, a dense coating is formed. The plasma arc application of the layers 4, and 5 can be effected using the Metco type 10MB plasma spray gun, manufactured by Metco, Inc. of Westbury, N.Y.

Although the plasma arc process is the preferred method of applying the ceramic-fluorocarbon layer to the roll, other methods such as oxyacetylene flame spraying and chemical vapor deposition can also be used.

The composition of the ceramic material used in the coating is conventional and can be formed of oxides such as, aluminum oxide, titanium oxide, chromium oxide, nickel oxide, manganese oxide, or the like, and mixtures of such oxides, or the ceramic can be formed of carbides such as tungsten carbide, chromium carbide, boron carbide, or the like, and mixtures of such carbides, used in the matrix of suitable corrosion resistant metals such as nickel, chromium, cobalt, or the like, and alloys containing these metals or nitrides, such as titanium nitride, hafnium nitride, vandium nitride, zirconium nitride, or the like, and mixtures or nitrides, or silicides, such as zirconium silicide, tantalum silicide, boron silicide, or the like, and mixtures of silicides with silicon dioxide; or mixtures of oxides, carbides, nitrides, silicides, and metal and alloys.

A preferred formulation of the ceramic material is as follows in weight percent:

Aluminum Oxide: 48.42%

Titanium Dioxide: 51.58%

Formulation of from 1.00 weight percent titanium dioxide, balance aluminum oxide to 80 percent titanium dioxide, 20 weight percent alumina can also be used.

For best results, the mixture of the ceramic components should be pre-sintered and ground. The ground mixture is then applied to the roll surface by the plasma arc process to provide a homogeneous ceramic-fluorocarbon polymer coating. Well mixed unsintered formulations can be used as well, but they suffer from a lack of complete homogenuity.

Improved bonding between the ceramic-fluorocarbon polymer coatings and the metal substrate 3 can be achieved by applying the corrosion resistant metal with the ceramic-fluorocarbon polymer material during the plasma arc process, instead of applying it as a separate, distinct layer. In this matter, a graduate content of the corrosion resistant metal can be obtained throughout at least a portion of the relatively thick ceramic-fluorocarbon polymer layer 5, the ceramic-fluorocarbon polymer layer having an inner portion with a relatively high corrosion resistant metal content and an outer portion having a relatively low corrosion resistant metal content. The graduated corrosion resistant metal content may be throughout the thickness of the ceramic-fluorocarbon polymer 5 layer. This is made possible due to the relative thick ceramic-fluorocarbon polymer layer. This construction is not feasible when using the thin ceramic coating of the prior art.

After the ceramic-fluorocarbon polymer layer 5 is applied to the roll, the outer surface of this layer 5 is ground to a relatively smooth surface, generally less than 16 RMS surface roughness.

In accordance with the teachings of the invention, a multiplicity of ink holes 6 are drilled into the ceramic-fluorocarbon polymer layer by a pulsed high energy source such as a pulsed laser source. The pulsed energy beam of appropriate diameter is focused on the surface of the roll. As the roll rotates and traverses the focused beam, holes 6 are machined in the ceramic-fluorocarbon polymer each time the energy beam is pulsed.

Adjustment of the diameter and power of the beam permits machining of holes of various diameters and depths, while regulation of the pulsing rate, speed of rotation and transverse movement of the beam relative to the roll, permits machining of a varying number of holes per square inch of roll surface. The volume of the holes, in conjunction with the distribution or pattern of the holes, determines the ink or medium delivering capacity of the surface.

Figure 3:
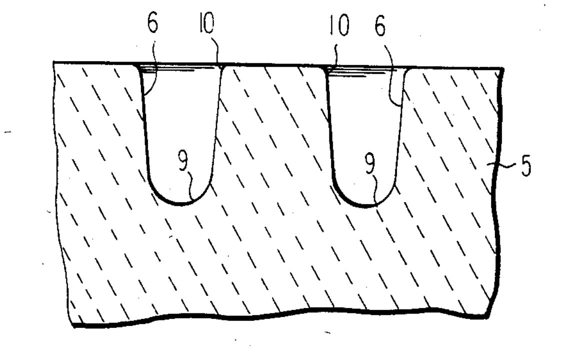
FIG. 3 is an enlarged fragmentary view of the outer surface of the transfer roll showing the details of the ink holes produced in accordance with the teachings of the invention.

FIG. 3 shows the details of the holes produced by the pulsed laser source, according to the teachings of this invention, as the roll 1 rotates through the pulsed energy beam. According to a feature of this invention the pulsing rate, speed of rotation and rate of transverse movement are made pseduorandomly variable during the production of a transfer roll to produce a non-uniform hole distribution pattern, which pattern eliminates the moire effect. In one embodiment of the invention, the speed of rotation of the roll was varied and the pulse rate held constant as the pulsed beam traversed the roll surface. This produced a varying hole packing configuration with only minor randomized variations in packing densities.

We have also determined that the application of the pulsed energy source, such as a pulsed laser, to ink hole formation permits very fine line counts which are relatively independent of hole volume. Thus, pulsed high energy source produced ink holes packed over 800 holes per linear inch have been attained. A transfer roll produced with 800 holes per linear inch equals a hole density of 640,000 holes per square inch. Using commercially available pulsed high energy sources, holes with diameters in the range of 0.0005 to 0.035 inch and depths in the range from 0.0005 to 0.0070 inch have been produced. The specific hole depth selected depends to a great degree on the required delivery characteristics.

According to the preferred embodiment of the invention, the pulsed high energy source vaporizes material on contact to produce a generally cylindrical hole 6 having straight walls 8 which allows much more volume to be obtained for receiving ink. The beam forms a hemispherical bottom 9 which allows the ink or other medium to be readily released from the hole reducing the need to periodically clean the holes. The holes are also provided with a rounded chamfered entrance 10 which prevents damage to mating components and allows the material being metered to lay more evenly on the surface of the roll. The ceramic-fluorocarbon coating has a substantially greater thickness than the depth of the holes, so that the holes only penetrate the outer portion of the ceramic-fluorocarbon layer. A hole 6 with the generally cylindrical intermediate portion 8, rounded, beveled entrance 10 and hemispherical bottom 9 is produced by using simultaneously pulsed high energy beams. The first beam operates in the TEM 00 mode to produce the cylindrical intermediate portion and hemispherical bottom. The second beam operates in the TEM 01 mode, focused to a doughnut shape having an outer diameter approximating the desired outer hole diameter and an inner diameter corresponding to the diameter of the cylindrical intermediate portion. The two beams are coaxially aligned and independently formed. We have determined that the intereference fringes produced by the two beams reinforcing each other in concentric gradients produce a smoothly radiused shoulder around the perimeter of the hole as well as the hemispherical hole bottom. The smoothly radiused hole top sharply reduce the wear to the doctoring blade, mating roll or printing plate caused by the sharp corners of the holes of prior art transfer rolls.

Additionally, we have found that sharp corners at the top of the ink hole tend to sheer the liquid film between the corner and the doctoring mechanism. Any breaking of the surface film generally results in a meniscus depression of the liquid inside the hole. Should the printing plate not make a strong contact with the depressed liquid meniscus inside the hole so as to break the surface tension, no liquid is delivered to the printing plate from that hole. Making the corner of the hole at the surface of the roll round eliminates this problem.

A sealant can be impregnated into the ceramic-fluorocarbon layer 5 either by incorporating the sealant with the ceramic-fluorocarbon material in the plasma arc process, or by vacuum impregnation of the ceramic-fluorocarbon layer after the layer 5 is applied to the roll. In this conventional manner of impregnation, a vacuum is applied to the roll to remove air and other gases from the voids or interstics of the ceramic-fluorocarbon coating. While maintaining the vacuum, the roll is exposed to a solvent solution, or dispersion of the sealant, causing the sealant to impregnate the voids. After impregnation, the roll is dried, preferably by heating, to evaporate the residual solvent.

The following example illustrates the manner of producing the transfer roll of the invention.

EXAMPLE

A cylindrical steel roll having a diameter of 4.085 inches was coated with a corrosion resistant coating 4 of nickel-titanium polytetrafluoroethylene having a thickness of 0.015 of an inch, using the plasma arc process. Then a multi-ported plasma apparatus such as the Metro type 10MB plasma spray gun is used to obtain high bond and hook effect by a graduation step, wherein the metal in the metal polytetrafluoroethylene coating is gradually reduced while gradually adding ceramic-polytetrafluoroethrlene to the plasma spray.

As an example: Pass 1 of the plasma spray gun would contain 85% metal, 10% ceramic, 5% polytetrafluoroethylene, and produce a thickness of 0.001 of an inch.

Pass 2 of the plasma spray gun would contain 65% metal, 30% ceramic and 5% polytetrafluoroethylene and produce a thickness of 0.001 of an inch.

Pass 3 would contain 45% metal, 50% ceramic and 5% polytetrafluoroethylene and provide a 0.001 thickness.

Pass 4 would contain 25% metal, 70% ceramic and 5% polytetrafluoroethylene and provide a 0.001 thickness.

Pass 5 would contain 5% metal, 90% ceramic and 5% polytetrafluoroethylene and provide a 0.001 thickness.

Pass 6 and subsequent passes are 95% ceramic and 5% polytetrafluoroethylene to produce the desired layer thickness of 0.060 of an inch.

The ceramic-fluorocarbon used in the example was a pre-sintered and reground composition having the following formulation in weight percent.

Aluminum Oxide: 48.42%
Titanium Dioxide: 46.38%
Polytetrafluoroethylene: 5.20%

The outer surface of the ceramic-fluorocarbon coated roll was ground to provide a surface finish of 8 RMS, and the roll was then mounted in a fixture and rotated and traversed axially by the coaxially aligned pulsed laser beams to machine a multiplicity of holes 6 in the ceramic-fluorocarbon coating. The holes had an inner diameter of 0.0025 of an inch, a depth of 0.0020 of an inch and were distributed in a pattern of 200×230 per square inch of roll surface. The rotation rate or the pulse rate of the pulsed energy source was varied each inch of circumference, such that the number of holes produced each inch were cyclically decreased and then increased by three holes per inch. This pattern was repeated over the entire roll surface.

The resulting roll provides precise and uniform distribtuion of ink to the print roll when used in a flexographic printing process.

While the above description has shown the invention as being used as an ink transfer roll, it is contemplated that the roll can be used for the transfer of other types of materials, such as paint, glue, toners, and the like.

Moreover, the holes drilled by the pulsed high energy beam need not extend over the entire periphery of the roll, but can be applied in any desired pattern, and the depth or volume of the holes can be varied throughout the periphery of the roll to provide varying delivering capacities for different portions of the roll surface.

What is claimed:

1. A method of making a transfer roll comprising the steps of:

(a) providing a metal base;
(b) depositing a coating of ceramic-fluorocarbon material over said metal base; and
(c) forming ink holes in said ceramic-fluorocarbon coating said ink holes being generally cylindrical in shape, having a hemispherical bottom, a generally cylindrical intermediate portion and a rounded, beveled entryway.

2. The method of making a transfer roll as claimed in claim 1, wherein said step of forming ink holes includes the steps of exposing said ceramic-fluorocarbon coating to a first pulsed beam from a high energy source, and exposing said ceramic-fluorocarbon coating to a second pulsed beam from a high energy source, said first and second pulsed beam being coaxially aligned, said second pulsed beam being focused to a doughnut shape having an outer diameter greater than the diameter of said cylindrical portion of the ink hole, whereby said second beam produces the rounded, beveled entryway and said first beam produces the cylindrical portion of said ink holes.

3. The method of making a transfer roll as claimed in claim 2 further including the steps of:

(a) rotating the transfer roll as the first and second pulsed beams impinge upon the surface of said roll to produce a line of ink holes about the circumference of said roll;
(b) causing said first and second pulsed beams to traverse the transfer roll in an axial direction to produce a plurality of said line of ink holes; and
(c) varying the pulsing rate of said pulsed beams as they scan a line about the circumference of said transfer roll to produce a non-uniform distribution of ink holes along said circumferential line.

4. The method of making a transfer roll as claimed in claim 3 further including the steps of:

(a) forming an intermediate layer of corrosion resistant metal and fluorocarbon polymer between said base and said coating of ceramic-fluorocarbon; and
(b) coating said ceramic-fluorocarbon material with a sealing material.

5. The method of making a transfer roll as claimed in claim 1 further including the step of grinding said ceramic-fluorocarbon coating to produce a relatively smooth surface having a surface roughness of less than 16 RMS.

* * * * *